(12) United States Patent
Stevenson et al.

(10) Patent No.: US 9,433,908 B2
(45) Date of Patent: Sep. 6, 2016

(54) ACCURATE DRY BULK HANDLING SYSTEM AND METHOD OF USE

(75) Inventors: Gary L. Stevenson, Spanishburg, WV (US); Daniel R. Whitcher, Sugar Land, TX (US)

(73) Assignee: PROVEN TECHNOLOGIES, LLC, Houston, TX (US)

( * ) Notice: Subject to any disclaimer, the term of this patent is extended or adjusted under 35 U.S.C. 154(b) by 79 days.

(21) Appl. No.: 14/009,510

(22) PCT Filed: Apr. 4, 2012

(86) PCT No.: PCT/US2012/032085
§ 371 (c)(1),
(2), (4) Date: Oct. 2, 2013

(87) PCT Pub. No.: WO2012/138702
PCT Pub. Date: Oct. 11, 2012

(65) Prior Publication Data
US 2014/0030031 A1  Jan. 30, 2014

Related U.S. Application Data

(60) Provisional application No. 61/471,555, filed on Apr. 4, 2011.

(51) Int. Cl.
*B65G 53/00* (2006.01)
*B01F 15/02* (2006.01)
(Continued)

(52) U.S. Cl.
CPC ............ *B01F 15/0238* (2013.01); *B01F 3/18* (2013.01); *B01F 13/0255* (2013.01); *B65G 53/66* (2013.01)

(58) Field of Classification Search
USPC ....... 406/50, 90, 91, 93, 127, 138, 151, 197; 366/106; 222/195
See application file for complete search history.

(56) References Cited

U.S. PATENT DOCUMENTS 2,767,030 A * 10/1956 Atkinson .................. 406/65
2,795,463 A * 6/1957 Weller ...................... 406/67
(Continued)

FOREIGN PATENT DOCUMENTS

CH        207033 A    9/1939
FR       1411454 A    9/1965
(Continued)

OTHER PUBLICATIONS

A Quick Look at Pneumatic Conveying System Basics, by Fabio Novelli & Mike Weyandt From www.powderbulk.com (Mar. 2010).
(Continued)

*Primary Examiner* — Joseph Dillon, Jr.
(74) *Attorney, Agent, or Firm* — David B. Dickinson

(57) ABSTRACT

Rapid evacuation and deployment of dry materials is achieved by the dual structure of this device and the method of using it to fill and empty vacuum reloading tanks automatically. This permits materials such a bentonite, barite or cement to be handled easily and without dust on a rig floor and mixed appropriately as needed for well control and completion operations. Dry bulk material is offloaded from an offshore supply vessel into atmospheric tanks, which provide fluidized bed systems to aerate and agitate and move material through piping into the vacuum re-loader tanks. The dual re-loader tank system allows one tank to be emptied while another fills thereby providing sufficient flexibility to expertly manage receiving, storage, transfer, filtration and control of the bulk material on various space-critical platforms, including offshore rigs and service vessels, that require the handling of dry bulk materials in an accurate and dust-free manner.

4 Claims, 2 Drawing Sheets

(51) Int. Cl.
*B01F 3/18* (2006.01)
*B01F 13/02* (2006.01)
*B65G 53/66* (2006.01)

(56) References Cited

U.S. PATENT DOCUMENTS

| | | | | |
|---|---|---|---|---|
| 2,955,879 | A * | 10/1960 | Tolman | 406/30 |
| 3,001,652 | A | 9/1961 | Schroeder et al. | |
| 3,039,827 | A | 6/1962 | Poundstone | |
| 3,309,148 | A * | 3/1967 | Wilder | 406/109 |
| 3,352,606 | A | 11/1967 | Page et al. | |
| 3,525,610 | A | 8/1970 | Meadows et al. | |
| 3,861,753 | A * | 1/1975 | Lesk et al. | 406/30 |
| 4,005,908 | A * | 2/1977 | Freeman | 406/25 |
| 4,085,975 | A | 4/1978 | Bentzen Bilkvist | |
| 4,115,070 | A * | 9/1978 | Jukkola et al. | 422/142 |
| 4,127,307 | A | 11/1978 | Bentzen Bilkvist | |
| 4,165,820 | A | 8/1979 | Dugge et al. | |
| 4,189,262 | A | 2/1980 | Anderson | |
| 4,264,243 | A | 4/1981 | Bentzen-Bilkvist | |
| 4,362,442 | A | 12/1982 | Bentzen-Bilkvist | |
| 4,410,106 | A * | 10/1983 | Kierbow | G01F 11/24 222/135 |
| 4,412,762 | A * | 11/1983 | Lepley et al. | 406/134 |
| 4,487,335 | A | 12/1984 | Bonerb | |
| 4,502,819 | A * | 3/1985 | Fujii et al. | 406/14 |
| 4,702,288 | A | 10/1987 | Ulveling et al. | |
| 4,797,038 | A * | 1/1989 | Correard | 406/138 |
| 4,830,545 | A * | 5/1989 | Salter et al. | 406/12 |
| 5,195,851 | A | 3/1993 | Shepard et al. | |
| 5,269,636 | A | 12/1993 | Shepard et al. | |
| 5,284,187 | A | 2/1994 | Schmit | |
| 5,378,089 | A * | 1/1995 | Law | 406/123 |
| 6,123,224 | A | 9/2000 | Kurtz | |
| 6,131,599 | A | 10/2000 | DeGood et al. | |
| 6,257,804 | B1 * | 7/2001 | Gathmann | 406/68 |
| 6,425,529 | B1 | 7/2002 | Reinsch | |
| 6,994,497 | B1 * | 2/2006 | Eriksson et al. | 406/124 |
| 7,080,960 | B2 * | 7/2006 | Burnett | B65G 43/08 406/11 |
| 7,793,741 | B2 * | 9/2010 | Harder | E21B 7/18 175/206 |
| 8,425,160 | B2 * | 4/2013 | Curle | B65D 88/32 166/162 |
| 9,133,701 | B2 * | 9/2015 | Luharuka | E21B 43/267 |
| 9,242,260 | B2 * | 1/2016 | Stevenson | B05B 7/30 |
| 2006/0054638 | A1 | 3/2006 | Bonerb | |
| 2008/0066911 | A1 * | 3/2008 | Luharuka | E21B 43/267 166/283 |
| 2010/0243251 | A1 * | 9/2010 | Luharuka | E21B 43/267 166/283 |
| 2011/0162838 | A1 * | 7/2011 | Mackenzie | B63B 27/20 166/267 |
| 2011/0240753 | A1 * | 10/2011 | Stevenson | B05B 7/30 239/8 |
| 2011/0284027 | A1 * | 11/2011 | Logan | B08B 9/08 134/10 |

FOREIGN PATENT DOCUMENTS

| | | |
|---|---|---|
| GB | 1417049 A | 12/1975 |
| WO | 2010/088270 A2 | 8/2010 |

OTHER PUBLICATIONS

European Application No. 12768602, EPO Form 2004C, Intention to grant dated Nov. 19, 2015.

* cited by examiner

ACCURATE DRY BULK HANDLING SYSTEM AND METHOD OF USE

This application claims priority to a U.S. Provisional Application Ser. No. 61/471,555, filed Apr. 4, 2011.

The present invention relates to a dry bulk handling system and, more specifically, to a dry bulk handling system that automatically and continuously loads and unloads dry bulk material in accurately measured amounts. Yet more specifically, this application claims an automatic dual-atmospheric vacuum reloading dry bulk system which not only rapidly and simultaneously loads and unloads dry bulk material, such as barite, bentonite, cement and other materials useful in the drilling and production of oil and gas from an offshore rig, but also that is easy to assemble, lightweight, efficient and limits the dust associated with the movement of these materials on the rig floor. The system readily allows the flow of dry materials from the point of delivery to the point of use in a minimum amount of time and with a minimal amount of human interaction. Although described herein for use on an offshore rig, the following description can also be adapted for use on a vessel for offshore service or a trailer for land use without departing from the spirit or intent of this application.

BACKGROUND OF THE INVENTION

The handling of dry materials in a confined space, such as on an offshore rig, has always been problematic. First, the delivery of material, such as cement, barite, bentonite or hydraulic-fracturing materials, is most economically made in their dry form with mixing to occur offshore. Second, space offshore must be used as economically as possible and finally, accuracy, control and continuity of delivery of the amount of the materials both ordered and used is a challenge. Applicant describes its embodiment for use on an offshore drilling rig, although it is not intended to limit this disclosure to such a use.

But using an offshore rig as an example, typically, a supply boat is used to deliver bulk materials to each rig, which then stores the material in large, heavy pressure vessels until used. After all the material has been removed from the rig's storage container and used, more material must be ordered and delivered to again fill these heavy pressure containers. Excess dry bulk material is generally ordered and stored on the rig to prevent running out of material halfway through a job. The present embodiment obviates the need for such bulk pressure storage facilities.

First, because of the rectangular geometric configuration of the atmospheric tanks used to store the material and the low vertical height of the entire system, higher volumes of dry materials may be more easily stored adjacent multiple separate pressure re-loader tanks. This compact and proximate configuration minimizes the wait for material to be delivered into each re-loading tank for use in the drilling process. Moreover, the loading, unloading, measuring and moving of dry bulk material to its final destination can be performed simultaneously and continuously from the parallel vacuum or pressure re-loading tanks, allowing the rapid completion of well servicing. The atmospheric storage tank or tanks supply the dry bulk material to the smaller vacuum re-loading tanks, which are substantially lighter than the high-pressure tanks ordinarily used in this application. The smaller vacuum or pressure re-loading tanks activated by an automated control system more accurately and rapidly allow the loading and unloading of the dry bulk material, thereby permitting more accurate mixing and use of the material on the rig.

The present system allows rapid loading and efficient storage of dry bulk materials in the atmospheric tanks; moving the dry bulk material more quickly from offshore supply boats or other sources. It also permits more accurate processing of the material after offloading onto the rig and minimizes the time and effort of rig personnel in moving materials on or off the rig and down-hole. Since the system can be closed, materials previously removed from the atmospheric storage tanks and held in the pressure re-loader tanks or in the lines can be redirected back into the storage tanks and the pressurized air running through the re-loader tanks and the lines automatically clears all debris from the system. This entire system is dust-free and low profile allowing this unit to be placed anywhere on a rig floor with available space without risk of dust contamination or injury to rig personnel. Since the atmospheric storage tank walls are thinner, the tank battery on the rig floor is lighter and more compact. Finally, the atmospheric tanks do not require periodic inspection and recertification since they are not maintaining materials under pressure. The present invention's lightweight, compact size, precision and ease of use solve many existing issues for the handling of dry bulk materials in this environment.

SUMMARY OF INVENTION

The present disclosure is a dry bulk handling system connected to an air pump system with at least one atmospheric storage tank, pressure tanks and an automated valve system to control the flow of material. Each storage tank has an inlet connected to a bulk loading input line for moving dry bulk material into the tank and a fluidized bed along a floor of at least one tank for aerating and agitating the dry bulk material. Each storage tank is connected to an air pump system with at least one atmospheric storage tank. The pump system provides a source for both air pressure and a vacuum for moving the dry bulk material throughout the system. Each storage tank has an inlet connected to a bulk loading input line for moving dry bulk material into the tank and a fluidized bed along a floor of the at-least one tank for aerating and agitating the dry bulk material. Each storage tank is connected by a conduit between the atmospheric tank to two or more vacuum or pressure re-loader tanks with control valves opening and closing the conduit running between the atmospheric tank and the two or more pressure re-loader tanks. The movement of the dry bulk material is monitored and coordinated by an automated control valve system providing signals to selectively activate the control valves into, out of and between the tanks. Each of the control valves can be actuated by an automated control system with a programmable logic controller (PLC) or other digital technology to move and remove dry bulk material from the atmospheric tanks into the pressure re-loader tanks and from the pressure re-loader tanks to the final destination of the dry material.

The atmospheric tank can have multiple partitions for storage of various kinds of dry bulk material or can be composed of several tanks used in tandem. Each atmospheric tank has a sloped fluidized bed at no less than 7°, and preferably 15° or more. The atmospheric tank can also be rectangular and non-pressurized, allowing more dry bulk material to be stored adjacent the re-loader tanks with a minimal amount of wasted time, space, and effort. Generally, the atmospheric tank will have a particulate-dustreducing filter system and a pressure relief valve and rupture disc operating at disparate differential pressures to make any excessive pressurization of the atmospheric storage tanks completely safe for those working around these systems.

This system uses a method for accurately mixing dry bulk materials in a confined space by filing an atmospheric storage tank with a dry bulk material; energizing a fluidized bed membrane in that tank by engaging an air source to the storage tank, aerating and agitating the dry bulk material in the atmospheric storage tank; creating a vacuum to move the dry bulk material from the storage tank into one or more pressure re-loader tanks; charging the pressure of that tank to move the dry material into a discharge line; and using an automated control system to permit the filling of a pressure re-loader tank while concurrently emptying another pressure re-loader tank into the discharge line. This automated control system can track the total volume and composition of dry material moved into and out of the re-loader tanks through the automated control system and stores that information for future evidential use. Additionally, this system can also move the dry material from the pressure re-loader tanks into a hopper for mixing with a fluid, if desired.

DESCRIPTION OF A PREFERRED EMBODIMENT

Figure 1:
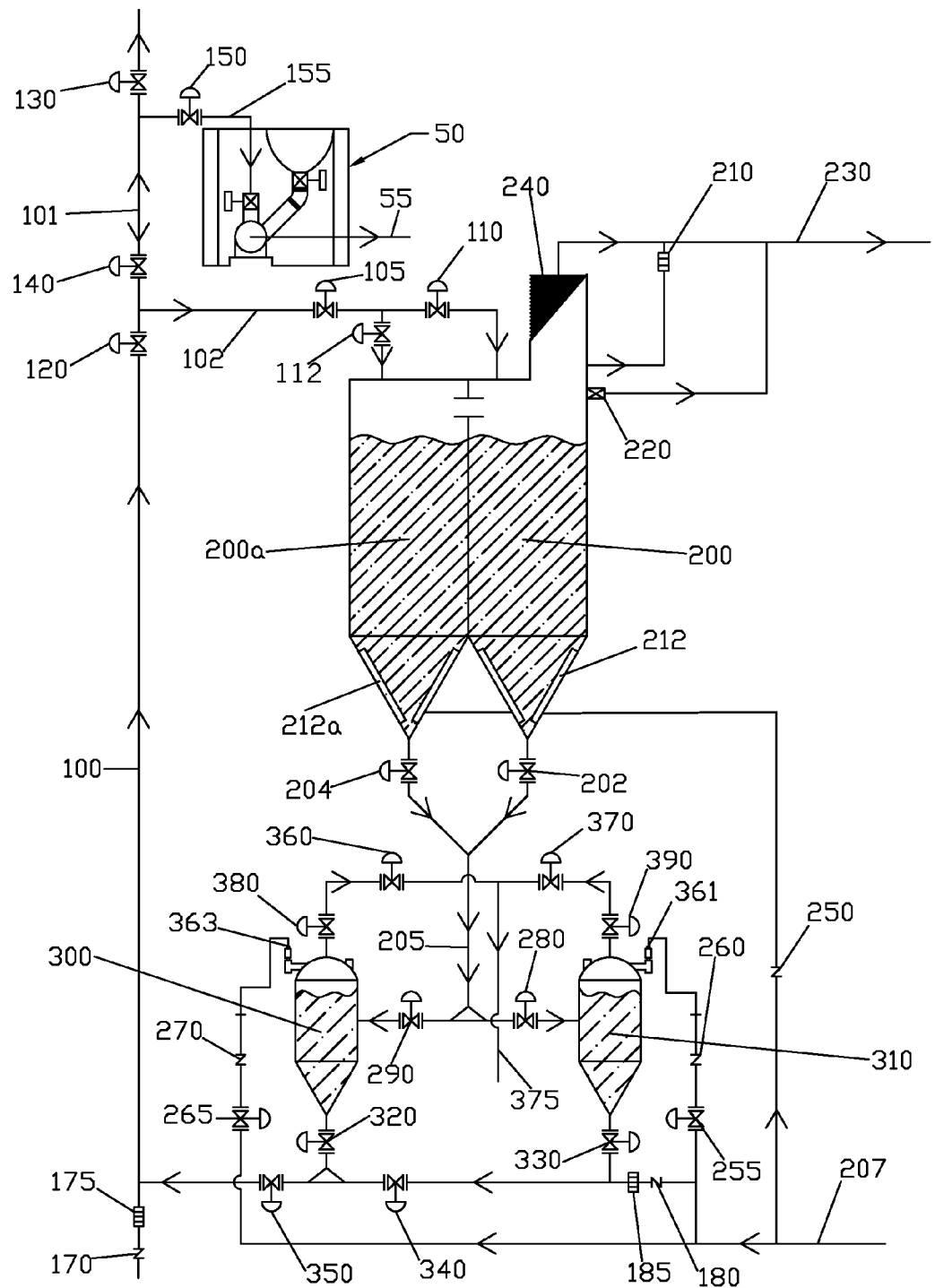
FIG. 1 is a process and flow diagram of the dry bulk system in a common configuration.

As more clearly shown in FIG. 1, loading of the atmospheric tanks 200, 200a and delivery to the final destination of the dry bulk material is accomplished through a common fill and discharge line 101. Automatic valves 105, 130, 140 and 350 allow selective movement into or out of this dry bulk handling system. Dry bulk material flows into the atmospheric tanks 200, 200a through line 102 filling either tank with all the same material or different materials depending on the needs of the client, accomplished through the selective opening of automatic valve 105, and the automatic valves 110, 112.

The dry material is moved through the atmospheric tank 200, 200a through a sloped floor, and a fluidized bed 212, 212a using an adequately sized closed compressed air system from the source (not shown) by line 207. The slope of the floor is important to allow free movement of the aerated and fluidized bed material to the outlet of the atmospheric tanks 200, 200a. The slope should not be less than 7°. A slope of less than this would inhibit the gravity feed of the dry bulk material. The slope can be any amount consistent with the movement of the material within the tanks and a preferred slope has been determined to be about 15°. This slope permits the slope of the atmospheric tank to remain above the minimum critical angle of slope on a pitching or rolling vessel deck. The slope of the fluidized bed 212, 212a in FIG. 1 is not intended to describe a realistic desired angle or slope, but is representative of the existence of the sloped fluidized bed only.

The fluidized bed 212, 212a is also important to the aeration of the bulk material during storage and movement into the vacuum re-loader tanks 300, 310 since it prevents unnecessary compaction of the dry bulk material and permits its ready movement into the vacuum re-loader tanks. This aeration feature is also helpful in moving all materials from the atmospheric storage tanks 200, 200a permitting their use for other inventoried dry bulk items without significant cleaning. This allows the present system to maximize inventory control of dry bulk materials in a compact space.

A source of compressed air is also delivered through line 207 to the discharge line 100 to facilitate pressurizing the purge valves 175, 185, which also prevents back flow through the check valves 170, 180, allowing the discharge line 100 to be completely clear of material at the conclusion of each job. The compressed air system line 207 is also used to charge the pressure re-loader tanks 300, 310 at 361 or 363 in alternating sequence by using the automatic valves 255, 265 and check valves 260, 270 allowing the rapid loading and unloading of material concurrently. The compressed air may be supplied from a drilling rig or ship or any other system connected to this present system all in a manner well known in the industry, but not shown herein; for example, two 750 SCFM air compressors/dryers could be adapted for use with the present system.

The vacuum re-loaders 300, 310 of the present system are arranged for segregation of the materials from each re-loader system through valves 280 or 290 to prevent cross-contamination and may be gravity fed from the atmospheric tanks 200, 200a at valves 204, 202 or they may arranged to communicate with a vacuum pump assist through line 375 at valves 360, 370, 380 and 390 for loading and unloading depending on the desired conveyance rate need for a particular application. The dry material is fed into the discharge line 100 at automatic valves 320, 330 and automatic valves 340, 350. All movement through the system is accomplished by the coordination of the automated control system to allow the flow, amount and mixture of the material to be precisely calculated. The automated control system is designed to monitor the system eight times (8×) per second so no human intervention is required once the operator sets the desired dry bulk requirements. The system automatically logs and stores all pertinent parameters for later evidential use by the owner or operator of the oilrig or the mud engineer. This information is valuable to mud engineers requiring precise measures of the amount of material being injected downhole, or in other applications where the mixture and amounts of material are critical.

A bag house filter system 240 on each atmospheric tank 200, 200a is arranged to allow venting through line 230 to the outside of all the atmospheric tanks used in the system. The atmospheric tank pressure relief system is fabricated to prevent excessive pressure build-up by automatically opening and relieving the tank through a selected pressure release valve 210 which opens if any nominal pressure is experienced with the atmospheric tank and by a redundant pop-off valve 220 allowing abnormal higher excess pressures to be vented through the common piping onboard or to be routed overboard through piping 230. Unlike other dry bulk systems, the present system prevents dust or other particulate from escaping the system. Escaping dust is captured in line 230, allowing for both cleaner and safer movement of dry materials, while permitting the system to be located in any available space on the rig floor without contamination of machinery or interference with the service personnel on the rig.

Optionally, the dry material can also be mixed in a hopper system shown at 50 allowing the finished dry mixture from discharge line 100, to be mixed or hydrated with liquids through automatic valve 150. The dry bulk material is then moved into the hopper 50, through line 155, and then discharged through an educator system, such as shown in applicant's U.S. Non-Provisional application Ser. No. 12/752,957 to its destination at line 55. This hopper system can also provide a redundant isolation value that prevents mixed or hydrated materials from flowing back into the distribution line 101 if the hopper outlet line 55 experiences a flow-stopping event. Again, this hopper system is automated to allow precise calculations of weight and volume to achieve a high level of certainty regarding mix and amount.

Figure 2:
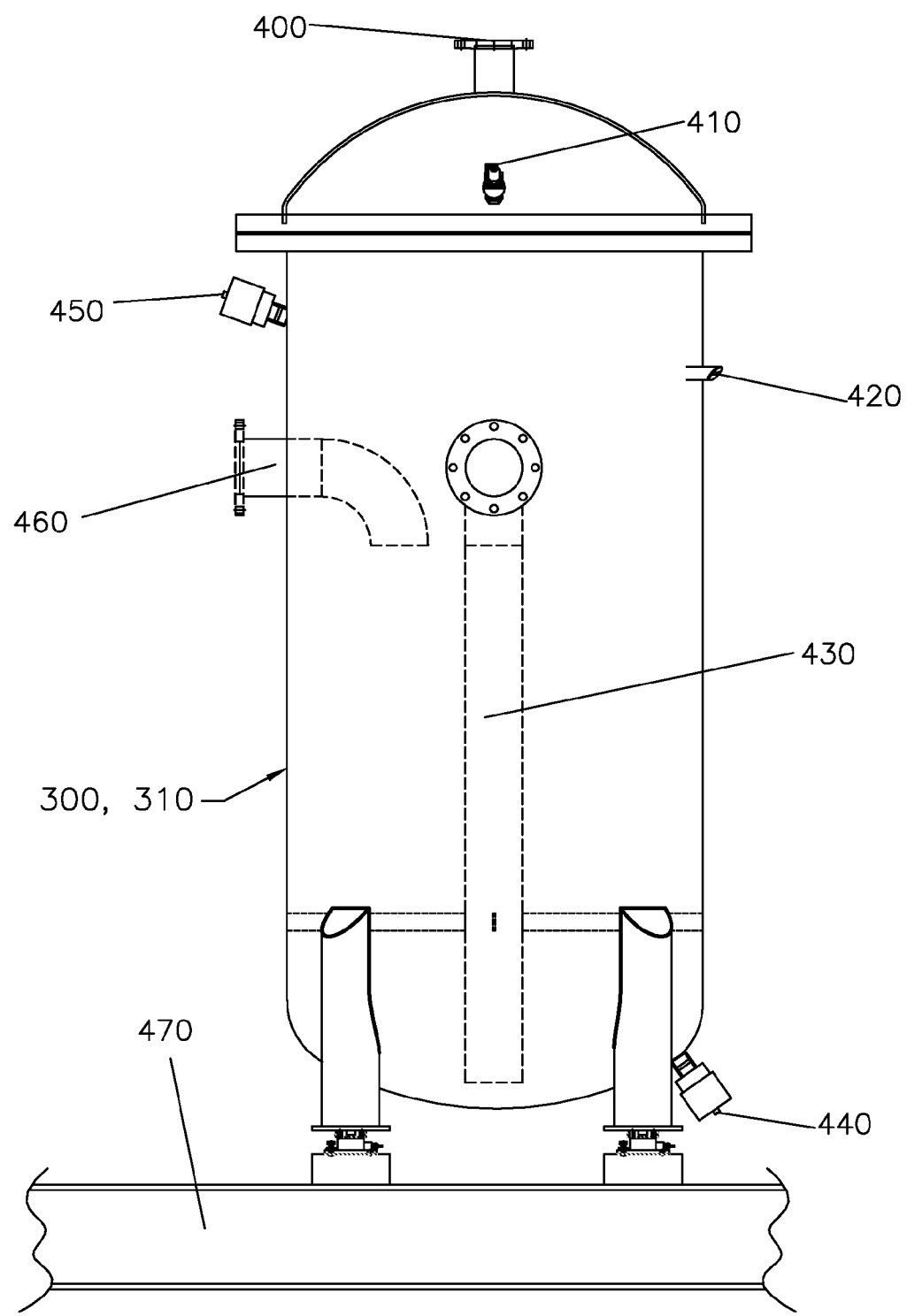
FIG. 2 is side view of one of the parallel vacuum or pressure re-loader tanks.

In FIG. 2, a close up side view of a single vacuum re-loader tank 300, 310 permits a dry bulk material such as bentonite to be loaded from an offshore supply vessel to the atmospheric storage tank or tanks 200, 200a as shown in FIG. 1, and then later routed from the deck 470 through an automatic valve shown in FIG. 1 at 290, 280 and deposited into either or both of the two vacuum re-loader tanks. As noted earlier in FIG. 1, each vacuum re-loader tank can be isolated from the other by an automatically operated valve 290, 280. The combination of the two vacuum re-loader tanks may be charged by selective operation of valves 202, 204 and discharged to achieve the maximum amount of dry material at an optimal mixture for the specific use as required. Since the supply available to each vacuum re-loader tank can be readily filled from the atmospheric storage tank, the vacuum re-loader tanks can be charged and discharged simultaneously and at selected rates to achieve the balance of bulk material flowing into the system required by the user.

For example, in FIG. 1, a vacuum is first created within the re-loader tank 300 by shutting off valve 320 and removing air through selective manipulation of the automatic valves 360 and 380. Then the dry bulk material is moved through valve 290 into the re-loader tank 300, which is then charged with compressed air through valve 363. When removal of the dry bulk material is required, valve 320 is opened and the dry bulk material is moved into discharge line 100. While re-loader tank 300 is discharging its material, re-loader tank 310 can be loading its material; both tanks cycle through this procedure, performing the same service in an alternating sequence to provide continuous movement of dry bulk material into the discharge line 100 through automatic valves 320 or 330.

As more clearly shown in FIG. 2, dry bulk material comes into the re-loader tanks 300, 310 through inlet port and internal tube 430 and drops to the bottom of the vacuum re-loader tank 300, 310. After the vacuum and material valves as described above are closed, the tank 300, 310 is charged with compressed air through inlet port 400, and the dry bulk material is moved out through the system connected to the tank through outlet port 460 into the discharge line 100 (not shown in FIG. 2). The vacuum re-loader tank 300, 310 configuration is shortened to allow the tank to be placed in a restricted vertical space by providing inlet and outlet ports located on the side of the tank as opposed to the top and bottom of the pressure tank. This configuration permits each pressure vessel to sit on the deck 470 without the significant piping usually found flowing from the bottom of such tank assemblies. The reduction in height of the pressure tanks also allows significant weight savings to this unique dry bulk system in contrast to the larger pressure vessel construction of prior art dry bulk handling systems.

FIG. 2 also discloses the position of the fill level sensors 440, 450 providing automatic feedback to the automated control system. Each vacuum re-loader tank also provides a pressure relief valve 410 to provide a redundant safety feature of the present embodiment, but is not required for this application. Each of these sensors provides input to the automated control system at the rate of eight times per second as previously discussed.

Fill level sensors 440, 450 and a flow meter 420 provide in every tank real-time feedback to the operator as to the level of material achieved. For example, at 90% full, the system will provide a flashing level notifying the operator to prepare to stop the loading process, proportionally throttle the flow, or reroute the materials to the second tank for filing. At 95%, an audible alarm sounds directing the operator to take action. At 99% full, the automated control system stops filling operations automatically and remains in alarm condition until the operator takes action.

When the amount of material needed is above the capacity of a single re-loader tank 300, 310, the vacuum re-loader system will continuously fill and discharge the number of loads required, achieving the desired delivery amount. The re-loader tanks are arranged on load cells (not shown) and also provide back-up level sensors. The automated control system takes the feedback signals from proportioning valves 320, 330 and sequences the tanks to load and discharge. The automated control system also keeps a record for 30 days of all loading and discharging providing continuous, real-time inventory control and a stored record of transactions to rig managers and mud engineers. This facilitates better management of mud and dry bulk materials, allows the development of use trends, and verifies materials used, all while allowing mud companies a means of substantiating billing records for the rig managers.

As an example of the utility of the present invention, because of the automation in handling dry bulk materials, the present system easily supports a mud mixing plant on the rig. A mud plant designed with multiple tanks, pump eductors and piping gives an unparalleled capability and level of redundancy not previously seen on offshore rigs. Each mud tank can be a 500 barrel design with two of the four tanks being segregated, allowing two 100 barrel slugging pits to be used independently of the active or reserve pits. The mud engineer therefore obtains unparalleled flexibility and response time in mixing and deploying differing weight drilling mud programs. The mixing equipment is dust free and allows the dry bulk materials to be pumped and combined easily. Exact weights of the dry material are easily provided from the automated control system. This system thus allows mud companies to mix and deliver their unique blends on the rig floor immediately prior to injection into the system.

Additionally, this system is formulated using off-the-shelf products and materials; thereby permitting ready repair and replacement of damaged or worn parts by rig personnel throughout the world without the cost of custom-machined parts or pieces and the associated lag times to source those parts.

The foregoing description has been directed to particular embodiments of the invention in accordance with the requirements of the statutes and for purposes of illustration and explanation of the manufacture and use. It will be apparent to those skilled in the art that many modifications and changes in the procedures set forth will be possible without departing from the scope and spirit of the invention. It is the applicants' intention to encompass all such modifications and variations.

What is claimed is:
1. A method for accurately mixing dry bulk materials in a confined space comprising:
filling a first atmospheric storage tank with a first dry bulk material;

energizing a first fluidized bed membrane by engaging an air source to said first atmospheric storage tank for aerating and agitating the first dry bulk material in the first atmospheric storage tank;

creating a vacuum to move the first dry bulk material from the first atmospheric storage tank into a first pressure re-loader tank;

charging the pressure of the first pressure re-loader tank to move the first dry bulk material into a discharge line from the first pressure re-loader tank;

using an automated control system to fill a second pressure re-loader tank from the first atmospheric storage tank while concurrently emptying the first pressure re-loader tank into the discharge line;

moving the first dry bulk material from the discharge line into a second atmospheric tank, the second atmospheric tank including a second dry bulk material therein, for mixing the first dry bulk material with the second dry bulk material and, tracking a total amount of the first dry bulk material and the second dry bulk material moved into and out of the first and second pressure re-loader tanks through the automated control system.

2. The method of claim 1 further comprising selectively moving the first dry bulk material mixed with the second dry bulk material from the first pressure re-loader tank or from the second re-loader tank into a hopper for mixing with a fluid.

3. The method of claim 1 further comprising storing information describing the volume and composition of the first dry bulk material, the second dry bulk material, and of the first dry bulk material mixed with the second dry bulk material moved by the dry bulk handling system for future evidential use.

4. The method of claim 1 further comprising:

energizing a second fluidized bed membrane by engaging the air source to the second atmospheric storage tank for aerating and agitating the first dry bulk material and the second dry bulk material in the second atmospheric storage tank;

creating a vacuum to move the first dry bulk material and the second dry bulk material from the second atmospheric storage tank into the first pressure re-loader tank;

charging the pressure of the first pressure re-loader tank to move the first dry bulk material and the second dry bulk material into the discharge line from the first pressure re-loader tank; and using the automated control system to fill the second pressure re-loader tank from the second atmospheric storage tank while concurrently emptying the first pressure re-loader tank into the discharge line.

* * * * *